United States Patent
Vandenbroucke et al.

(10) Patent No.: US 12,492,940 B2
(45) Date of Patent: Dec. 9, 2025

(54) MEASUREMENT EQUIPMENT FOR SPECTROSCOPIC ANALYSIS OF INDIVIDUAL MOVING OBJECTS

(71) Applicant: PHARMA TECHNOLOGY, Thines (BE)

(72) Inventors: Freddy Vandenbroucke, Roux (BE); Martial Dollinger, Braine l'Alleud (BE)

(73) Assignee: PHARMA TECHNOLOGY, Thines (BE)

( * ) Notice: Subject to any disclaimer, the term of this patent is extended or adjusted under 35 U.S.C. 154(b) by 88 days.

(21) Appl. No.: 18/005,957

(22) PCT Filed: Jul. 12, 2021

(86) PCT No.: PCT/EP2021/069351
§ 371 (c)(1),
(2) Date: Jan. 18, 2023

(87) PCT Pub. No.: WO2022/017854
PCT Pub. Date: Jan. 27, 2022

(65) Prior Publication Data
US 2023/0280209 A1    Sep. 7, 2023

(30) Foreign Application Priority Data

Jul. 20, 2020  (BE) .................................. 2020/5545

(51) Int. Cl.
*G01J 3/02* (2006.01)
*G01J 3/50* (2006.01)
*G01N 35/04* (2006.01)

(52) U.S. Cl.
CPC .......... *G01J 3/0218* (2013.01); *G01J 3/0202* (2013.01); *G01J 3/50* (2013.01); *G01N 35/04* (2013.01); *G01N 2035/0432* (2013.01)

(58) Field of Classification Search
CPC .......... G01J 3/0218; G01J 3/0202; G01J 3/50; G01N 35/04; G01N 2035/0432; G01N 2021/8455; G01N 21/9508; G01N 21/474
See application file for complete search history.

(56) References Cited

U.S. PATENT DOCUMENTS

2002/0039186 A1*   4/2002   Rosenberg ......... G01N 21/8507
                                                        356/432
2002/0109094 A1    8/2002   Goetz et al.
(Continued)

FOREIGN PATENT DOCUMENTS

CN      101903762 A    12/2010
EP       1674859 A1     6/2006
(Continued)

OTHER PUBLICATIONS

International Search Report for PCT/EP2021/069351 (Sep. 27, 2021).

(Continued)

*Primary Examiner* — Hwa Andrew Lee
(74) *Attorney, Agent, or Firm* — Merchant & Gould P.C.

(57) ABSTRACT

Measurement equipment can be used for control with spectroscopic analysis of individual moving objects. The measurement equipment includes a probe with a surface, from which one or more illumination optical fibres and measurement optical fibres emerge. The optical fibres are arranged so that at least one of the second acceptance cones intersects at least one first acceptance cone at less than 10 mm from the surface. The measurement equipment includes a triggering device detecting the objects upstream of the probe to activate or deactivate the observation of the objects by the probe.

11 Claims, 4 Drawing Sheets

(56) References Cited

U.S. PATENT DOCUMENTS

2019/0250105 A1* 8/2019 Mahadevan-Jansen .. G01J 3/44
2020/0046010 A1* 2/2020 Knorr .................... A23N 15/02

FOREIGN PATENT DOCUMENTS

| EP | 3575776 A1 | 12/2019 |
|----|------------|---------|
| JP | 2010127680 A | 6/2010 |
| WO | 2001027597 A1 | 10/2000 |
| WO | 2006/116569 A2 | 11/2006 |
| WO | 2007040589 A1 | 4/2007 |
| WO | 2009081358 A1 | 12/2008 |
| WO | 2014040486 A1 | 3/2014 |
| WO | 2014/116277 A1 | 7/2014 |

OTHER PUBLICATIONS

Japanese Office Action received for JP Application No. 2023-504179, mailed Feb. 25, 2025, 4 pgs.
Chinese Office Action received for CN Application No. 202180060211.2 on Jul. 27, 2025, 17 pgs.

* cited by examiner

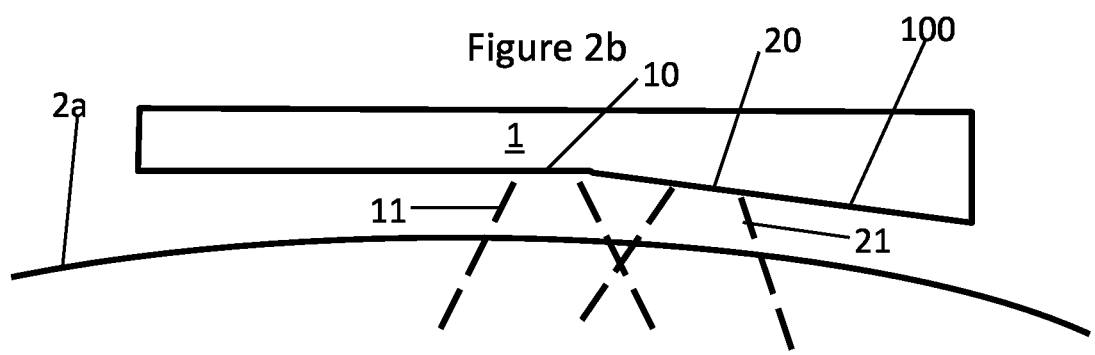
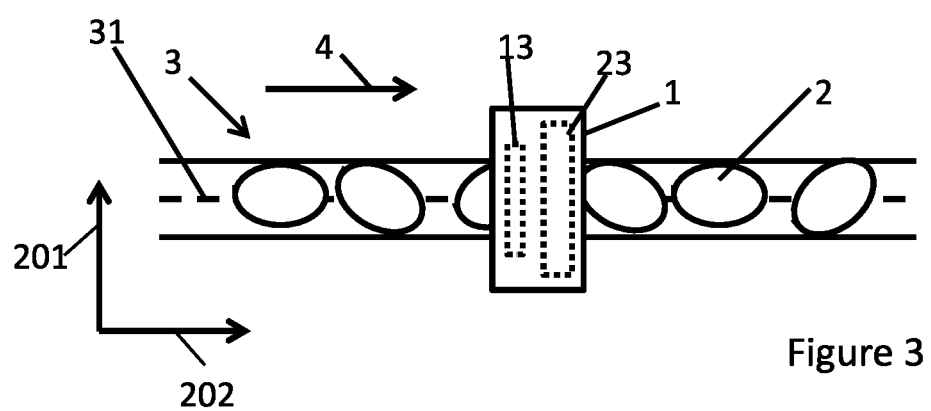

MEASUREMENT EQUIPMENT FOR SPECTROSCOPIC ANALYSIS OF INDIVIDUAL MOVING OBJECTS

This application is a National Stage Application of PCT/EP2021/069351, filed Jul. 12, 2021, which claims benefit of Patent Application No. 2020/5545, filed Jul. 20, 2020 in Belgium, and which applications are incorporated herein by reference. To the extent appropriate, a claim of priority is made to each of the above-disclosed applications.

TECHNICAL FIELD

The present invention relates to an equipment for carrying out a spectroscopic analysis control of moving objects, for example a spatially resolved infrared spectroscopy analysis of drugs.

BACKGROUND

There are equipments with probes designed to be placed over moving objects. These probes have a surface on which illumination optical fibres and measurement optical fibres open out. A problem with known probes is that some objects or segments of objects are not observed by any fibre or are not observed well enough for an individualised spectroscopic analysis per object to be possible.

The document WO2006116569 describes an optical reflectance measurement applied to a portion of the human body. The document WO2014116277 describes a transcutaneous sensor geometry. In these types of measurements, the observed objects are not moving and are not particularly small, and the problem mentioned above does not arise.

The document EP1674859 describes a detector for detecting a certain type of object among a plurality of objects. This document focuses on the treatment of the data received and does not mention the problem mentioned above.

The document EP3575776 describes a measurement system for small volume items in bulk. In this system, some fibres are above and below the objects, which makes it particularly complicated.

SUMMARY OF THE INVENTION

An object of the present invention is a measurement equipment arranged for improved observation of moving objects, in particular for the purpose of a spatially resolved infrared spectroscopic analysis of said individual objects.

For this purpose, the invention proposes a measurement equipment comprising a probe for observing objects moving along a longitudinal direction, preferably for carrying out a spatially resolved spectroscopic analysis on said objects, a triggering device offset from the probe along the longitudinal direction, and a control unit;
the probe comprising:
a surface extending along the longitudinal direction and along a lateral direction perpendicular to the longitudinal direction,
one or more first optical fibres opening out onto said surface and arranged to emit electromagnetic radiation from at least one source, each first optical fibre having a first acceptance cone,
second optical fibres opening out onto said surface, and arranged to capture electromagnetic radiation and transmit it to a receiving device, each second optical fibre having a second acceptance cone, the second optical fibres being offset from the first optical fibre or fibres along the longitudinal direction and located on a same side of the first optical fibre or fibres;
the probe being such that at least one of the second acceptance cones intersects at least one first acceptance cone at less than 10 mm of said surface;
the triggering device being configured to detect the moving objects; and
the measurement equipment being configured to activate the observation of the objects by the probe in response to their detection by the triggering device.

The inventors have realised that the problems with current probes come in particular from their arrangement in which second optical fibres (capture optical fibres) are distributed into two lateral groups on either side of first optical fibres (illumination optical fibres). This is because in this known arrangement the central area of the conveyor is too far away from the second optical fibres to be visible. The inventors first changed the orientation of the known probe with respect to the moving direction, but then the second optical fibres are distributed over such a long length in the direction of moving that the number of images taken during a passage of an object under the probe becomes insufficient to make a quality spectroscopic analysis.

In the probe according to the invention, all the second optical fibres are offset along the direction of moving of the first optical fibre or fibres and located on a same side of the first optical fibre or fibres. This allows, for a given number of second optical fibres, a better lateral distribution of the second optical fibres to eliminate the areas where the objects are not visible. The smaller objects located in the centre of the conveyor are therefore better observed in particular.

An objective of the invention is to be able to make rapid analyses in order to have a good flow of objects. The total number of optical fibres is then a constraint because distributing the optical fibres over a small enough distribution surface of the assembly of optical fibres in the orientation of the moving allows for a good spatial resolution at high moving speeds, while avoiding unnecessary optical fibres. The distribution of the fibres according to the invention allows a better distribution for a given total number of optical fibres.

In addition, the number of effectively active second optical fibres is also a constraint, as the length of the treatment of the captured information increases with the number of second optical fibres. In the invention, the better lateral distribution of the latter allows to reduce the number of active second optical fibres, and thus the treating time for the information per measurement. Thus, the frequency of measurements can be increased, and ultimately, the measured results can be improved because they can be based on a larger number of measurements (which can be averaged to reduce the signal-to-noise ratio, for example).

The arrangement of the optical fibres according to the invention also allows each object to be observed via photons that have travelled widely varying distances within the objects. This is because when the electromagnetic radiation penetrates an object shallowly, it emerges close to its point of entry, and is then generally captured by a second optical fibre close to the first optical fibre that emitted it; whereas when electromagnetic radiation penetrates deeper into an object, it emerges further away from its point of entry, and is then generally captured by a second optical fibre further from the first optical fibre that emitted it. Thus, a large variation in the distance between the first and second optical fibres allows to provide a richer spectral information.

Furthermore, as in the invention the first and second optical fibres are sufficiently close that their acceptance cones are dissociated over a distance of at most 10 mm, the capture of electromagnetic radiation reflected by the surfaces of the objects located within this distance is particularly low. This is a great advantage in spatially resolved infrared spectroscopy where the scattered electromagnetic radiation is of interest and the reflected electromagnetic radiation is harmful.

Furthermore, since the first and second fibres are offset in the direction of moving, the objects are illuminated over a clearly defined moving length and are detected over a defined moving length, which simplifies the treatment of the received data.

Moreover, since the maximum width for distributing all the optical fibres is a technical constraint, the distribution of the fibres of the invention allows to cover a particularly large portion of this maximum width.

The probe is of the type used for analytical techniques referred to as Single Particle Counter where each photon is counted.

Since the second optical fibres are offset from the first optical fibre or fibres along the longitudinal direction and located on a same side of the first optical fibre or fibres, and the second acceptance cones are disassociated from any first acceptance cone by a fixed distance of at most 10 mm measured from said surface:
  there is a first reference plane at at most 10 mm from that portion of the surface into which the first optical fibres opens out such that each first optical fibre has a first acceptance cone whose intersection with the first reference plane forms a first circle, the first circles of all the first optical fibres of the probe being inscribed in a first reference rectangle,
  there is a second reference plane at at most 10 mm from the portion of the surface onto which the second optical fibres opens out such that each second optical fibre has a second acceptance cone whose intersection with the second reference plane forms a second circle, the second circles of all the second optical fibres of the probe being inscribed within a second reference rectangle, and
  the first reference rectangle and the second reference rectangle do not overlap.

Although some characteristics are described as relating to several first optical fibres, it should be understood that they are also appropriate in the case where the probe comprises only one first optical fibre, unless explicitly stated otherwise.

The triggering device allows an object to be detected before it arrives in the viewing area of the probe, so as to trigger the activation of the probe at the moment the object arrives in the viewing area of the probe. The triggering device is upstream of the probe in relation to the moving of the objects. Preferably, the triggering device sends information to a control unit in order to activate or deactivate the probe. When the triggering device starts to detect the object, it sends an object detection information to the control unit, which uses this information and the moving linear speed of the conveyor to calculate the moment of activation of the probe. When the triggering device stops detecting the object, it sends a conveyor detection information to the control unit, which uses this information and the moving linear speed of the conveyor to calculate the moment of deactivation of the probe.

In the scope of the present document, an "activated" probe is a probe that is capable of making an observation. An "activation" of the probe preferably comprises an activation of at least some of the second optical fibres, and a "deactivation" of the probe preferably comprises a deactivation of the activated second optical fibres. It is possible, while remaining within the scope of the present invention, that the first optical fibre or fibres remain activated even when the probe is deactivated.

According to an embodiment, the triggering device comprises two detecting elements offset from each other along the lateral direction. Preferably, each detection element detects a point on the conveyor. An information related to each of the detecting elements, i.e. each of the points, is sent to the control unit.

According to one embodiment, each detection element is on a separate laser detector, the laser detectors being arranged to be displaceable along the lateral direction. Their lateral position can thus be adapted mechanically to the size of the objects on the conveyor. An example of a suitable laser detector is a Keyence LK-G detector or a Panasonic HL-C detector.

In another embodiment, the triggering device emits a beam extending along the lateral direction, the detecting elements each comprising a separate segment of a detector arranged to capture the beam after reflection on the objects. The lateral and/or longitudinal position of the detecting elements can then be digitally adapted to the size of the objects on the conveyor. An example of a suitable triggering device is the Keyence CMOS HSE detector.

According to an embodiment, the second optical fibres are distributed over the surface over a longitudinal extension and over a lateral extension such that the longitudinal extension is less than the lateral extension.

Such an arrangement allows a distribution of the second optical fibres over a particularly large width for a given number of second optical fibres. In addition, the small longitudinal extension allows for an increase in the number of measurements made on each object as it is moved, which improves the quality of the results obtained from the measurements.

According to an embodiment, the first optical fibres are distributed over the surface over a longitudinal extension and a lateral extension such that the longitudinal extension is less than the lateral extension. Such an arrangement, which necessarily comprises several first optical fibres, allows the first optical fibres to be distributed over a particularly large width for a given number of first optical fibres. In addition, it is best to avoid illuminating the edges of the objects as this deteriorates the reproducibility of the measurements. This is because the signal from the top of the objects is more homogeneous over the assembly of the objects than the signal from the edges of the objects.

According to an embodiment, the second optical fibres are distributed over a greater width than the first optical fibre or fibres, the width being taken along the lateral direction. This allows the second optical fibres to be distributed over a particularly large width for a given number of optical fibres. In addition, it is preferable to avoid illuminating the edge of the conveyor as this deteriorates the reproducibility of measurements.

According to an embodiment, the second optical fibres are distributed over a smaller length than the first optical fibre or fibres, the length being taken along the longitudinal direction. This allows the second optical fibres to be distributed over a particularly large width for a given number of optical fibres.

According to one embodiment, the first optical fibres are distributed in at most three laterally extending rows. Such a distribution allows a better distribution of the first optical fibres in width for a given number of first optical fibres.

According to one embodiment, the second optical fibres are distributed in at most three laterally extending rows. This allows a better distribution of the second optical fibres in width for a given number of second optical fibres.

According to an embodiment, in which the probe comprises a plurality of first optical fibres, the second optical fibres are on average further apart from each other than the first optical fibres. This allows for improved observation, for a given number of optical fibres.

In one embodiment, the probe comprises more first optical fibres than second optical fibres. Indeed, the arrangement of the assembly of optical fibres as defined in the invention allows to limit the number of second optical fibres, and thus, for a given total number of optical fibres, allows to increase the number of first optical fibres, and thus the signal-to-noise ratio.

The invention further provides a measurement system comprising an equipment according to any one of the embodiments, at least one source of electromagnetic radiation, a receiving device, and a conveyor arranged to transport the objects along a direction of moving (which is the longitudinal direction), so that the objects are detectable by the triggering device on a portion of the conveyor and are observable by the probe on a portion of the conveyor. The first reference rectangle is preferably offset from the second reference rectangle along the direction of moving of the moving objects. In other words, the first reference rectangle is preferably upstream or downstream of the second reference rectangle. The first and the second reference rectangles preferably have two sides parallel to the direction of moving.

According to an embodiment, the system comprises the objects, the probe is above the objects, and the system is arranged so that the top of the objects is located between the surface and at least one intersection between a first and a second acceptance cone. This allows to avoid capturing radiation reflected from the objects, which is particularly interesting for the spatially resolved spectroscopic analysis using the scattered radiation.

According to an embodiment, the system further comprises a spectral analysis device arranged to receive information from the receiving device. This allows the spatially resolved spectroscopy to be carried out for each of the objects.

The present invention also proposes for the mounting of an equipment according to the invention in a measurement system.

The invention further proposes a use of a measurement equipment or system according to the invention, wherein the first optical fibre or fibres emit the electromagnetic radiation towards the objects, and the second optical fibres receive the electromagnetic radiation from the objects. During use, some of the second optical fibres may be deactivated, for example if it is found that the electromagnetic radiation at their location is not sufficient for making a quality spectroscopic analysis.

Preferably, the detection of an object by the triggering device leads in an activation of the probe.

The invention further proposes a use of a measurement system comprising the following steps:
the first optical fibre or fibres emit the electromagnetic radiation towards the objects,
the second optical fibres receive the electromagnetic radiation from the objects and transmit it to the receiving device,
the receiving device receives the electromagnetic radiation and transmits information about the received electromagnetic radiation to the spectral analysis device,
the spectral analysis device carries out a spectral analysis, and
the measurement system transforms the results of the spectral analysis with the help of a mathematical model to determine physical and/or chemical characteristics of the objects.

Then, the objects that do not meet one or more of the specified criteria after the calculations can be set aside.

BRIEF DESCRIPTION OF THE FIGURES

Further characteristics and advantages of the invention will become apparent from the following detailed description, for the understanding of which reference is made to the appended figures, among which:

FIG. 2b is a schematic lateral view of a probe according to another embodiment of the invention, FIG. 3 is a schematic top view of a probe and a conveyor according to one embodiment of the invention.

EMBODIMENTS OF THE INVENTION

The present invention is described with particular embodiments and references to figures but the invention is not limited thereby. The drawings or FIGS. described are only schematic, are generally not to scale and are not limiting. In addition, the functions described may be carried out by structures other than those described in this document.

In the context of this present document, the terms "first" and "second" are used only to differentiate the various elements and do not imply an order between these elements.

In the figures, the identical or similar elements may have the same references.

Figure 1:
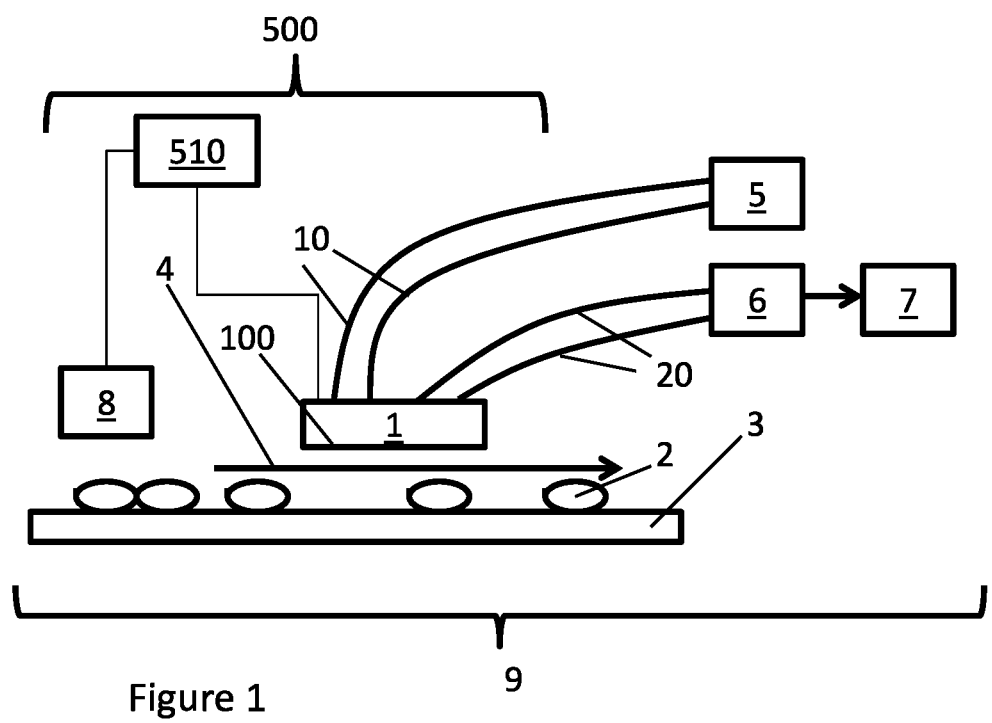
FIG. 1 is a schematic lateral view of a measurement system according to one embodiment of the invention.

FIG. 1 schematically illustrates a measurement system 9 according to one embodiment of the invention. The measurement system 9 comprises a measurement equipment 500 according to the invention, and a conveyor 3 arranged to transport the objects 2 along a moving direction 4. The measurement equipment 500 comprises a probe 1 and a triggering device 8 upstream of the probe 1, arranged so that the objects 2 are detectable by the triggering device on a portion of the conveyor 3 (the detection area of the triggering device 8) and observable by the probe 1 on a portion of the conveyor 3 (the observation area of the probe 1). The measurement system 9 further comprises at least one source 5 of electromagnetic radiation, a receiving device 6, and preferably a spectral analysis device 7 arranged to receive information from the receiving device 6. The objects 2 preferably have a horizontal extension between 2 and 25 mm. These are, for example, drugs.

The triggering device 8 preferably comprises a laser detector detecting the presence of objects 2 on the conveyor 3. It allows to activate the probe 1: the detection of an object 2 by the triggering device 8 results in an observation of the object 2 by the probe 1. In this way, only the objects 2 are observed by the probe 1, and the conveyor 3 is not considered.

The measurement equipment 500 preferably comprises a control unit 510 which exchanges information with, in particular, the triggering device 8 and the probe 1.

The probe 1 comprises a surface 100 oriented towards the conveyor 3, and on which one or more first optical fibres 10 and second optical fibres 20 open out. The ends of the first optical fibre or fibres 10 and the second optical fibres 20 are preferably flush with the surface 100. The surface 100 extends along a lateral direction 201 and a longitudinal direction 202 (shown in FIG. 3) which are perpendicular to each other. The probe 1 is preferably stationary. The trajectory of the objects 2 can be any. The moving linear speed is preferably between 0.1 and 3.0 m/s.

The source 5 emits electromagnetic radiation, in particular with an infrared component, which is transmitted by the first optical fibre or fibres 10 and emitted by the ends of the first optical fibre or fibres 10 towards the objects 2. The objects 2 reflect and scatter the electromagnetic radiation, in particular in the direction of the second optical fibres 20. When the electromagnetic radiation interacts with the objects 2, the characteristics of the electromagnetic radiation are changed. This will allow to carry out a spectroscopic analysis of the objects 2 based on the electromagnetic radiation scattered by the objects 2 and captured by the second optical fibres 20. The ends of the second optical fibres 20 thus capture electromagnetic radiation from the objects 2, and the second optical fibres 20 transmit this electromagnetic radiation to the receiving device 6.

The receiving device 6 preferably comprises a camera, with a CCD, which receives the electromagnetic radiation. The receiving device 6 sends information about the electromagnetic radiation to the spectral analysis device 7. The spectral analysis device 7 carries out a spectral analysis, preferably by infrared spectroscopy. The measurement system 9 can then compare the results of the spectral analysis with a theoretical model to determine physical and/or chemical characteristics of the objects 2. Calculation methods are put in place to take into account only the relevant information, and thus avoid the effects due to the edges of the objects 2.

Figure 2A:
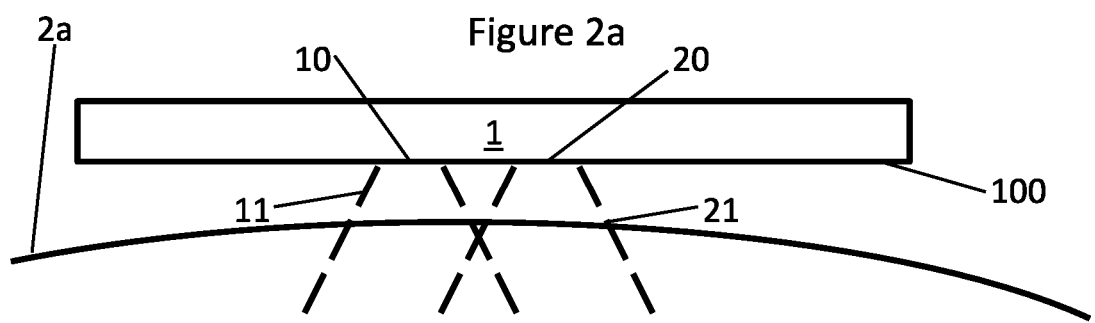
FIG. 2a is a schematic lateral view of a probe according to one embodiment of the invention.

As illustrated schematically in FIGS. 2a, 2b, each of the first optical fibres 10 has a first acceptance cone 11, and each of the second optical fibres 20 has a second acceptance cone 21. It is known to the person skilled in the art that the acceptance cone of an optical fibre is such that if a light ray attempts to penetrate the optical fibre from this cone, then the ray will be guided by total internal reflection; otherwise, the ray will not be guided.

The measurement system 9 is preferably arranged so that at least one intersection between first 11 and second 21 acceptance cones is between the top 2a of the objects 2 and the bottom of the objects 2.

In the invention, the arrangement of the first optical fibres 10 and the second optical fibres 20 on the surface 100 of the probe 1 is such that the second optical fibres 20 are offset from the first optical fibre or fibres 10 along the longitudinal direction 202 and located on a same side of the first optical fibre or fibres 10 and such that at least one of the second acceptance cones 21 intersects at least one of the first acceptance cones 11 (or the first acceptance cone 11 if there is only one first optical fibre) at less than 10 mm of the surface 100. Preferably, a first acceptance cone 11 and a second acceptance cone 21 intersect between 1 and 2 mm from the surface 100.

FIG. 3 shows schematically a possible arrangement of the probe 1 in relation to the conveyor 3. The conveyor 3 is preferably horizontal and carries the objects 2. The probe 1 is located above the conveyor 3, with the surface 100 oriented downwards. The objects 2 may be present in a single line on the conveyor 3 (as shown in FIG. 3), in several lines, or in a random arrangement.

In the scope of this document, the lateral direction 201 is the direction of the width of the conveyor 3, and the longitudinal direction 202 is the moving direction 4, and is perpendicular to the lateral direction 201. The lateral direction 201 could be referred to as "first direction", and the longitudinal direction 202 could be referred to as "second direction" or "moving direction".

In the invention, the arrangement of the first optical fibres 10 and the second optical fibres 20 on the surface 100 of the probe 1 is such that all the first optical fibres 10 of the probe 1 are inscribed in a first rectangle 13, and all the second optical fibres 20 of the probe 1 are inscribed in a second rectangle 23 which does not intersect the first rectangle 13. If the probe comprises only a first optical fibre 10, it is inscribed in a first rectangle 13 which does not intersect the second rectangle 23.

The first 13 and the second 23 rectangles preferably have two sides parallel to the direction of moving 4. The first 13 and second 23 rectangles are preferably inscribed in a 3 mm×4 mm rectangle.

The first rectangle 13 is preferably located upstream or downstream of the second rectangle 23 along the direction of moving 4. The first rectangle 13 and the second rectangle 23 are preferably centred laterally with respect to a same central longitudinal plane 50 (visible in FIG. 4) which is coincident with a longitudinal plane 31 centred with respect to the conveyor 3.

Figure 4:
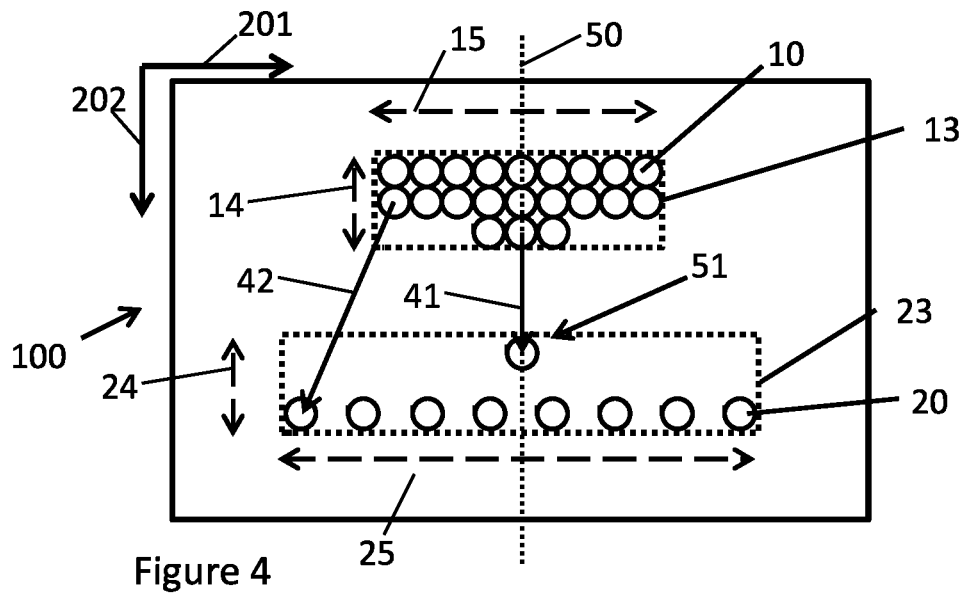
FIG. 4 is a schematic bottom view of a probe having an optical fibre arrangement according to a first embodiment of the probe.

FIG. 4 illustrates an arrangement of the optical fibres in a first embodiment of the invention. Certain parameters of the invention are also shown, in particular the longitudinal extension 14 of the first optical fibres 10, the lateral extension 15 of the first optical fibres 10, the longitudinal extension 24 of the second optical fibres 20, and the lateral extension 25 of the second optical fibres 20 on the surface 100. When the probe 1 is taken in isolation from the conveyor 3, the lateral 201 and longitudinal 202 directions are perpendicular to each other, and are considered independently of any external referential.

The arrows 41 and 42 illustrate that the invention allows to obtain both a particularly short distance (arrow 41) and a particularly long distance (arrow 42) between a first optical fibre 10 and a second optical fibre 20.

Figure 5A:
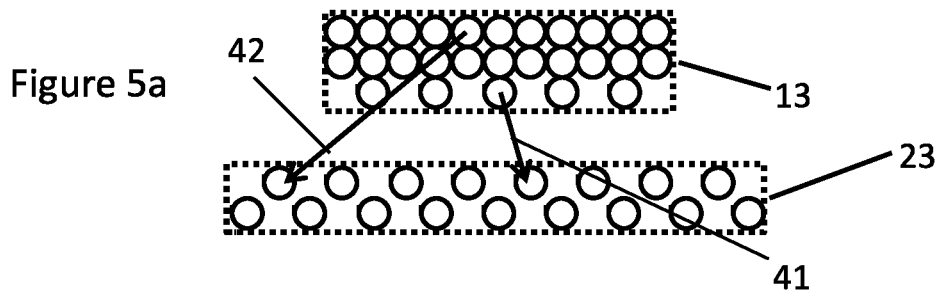
FIG. 5a is a schematic bottom view of optical fibres in an arrangement according to a second embodiment of the probe.
Figure 5B:
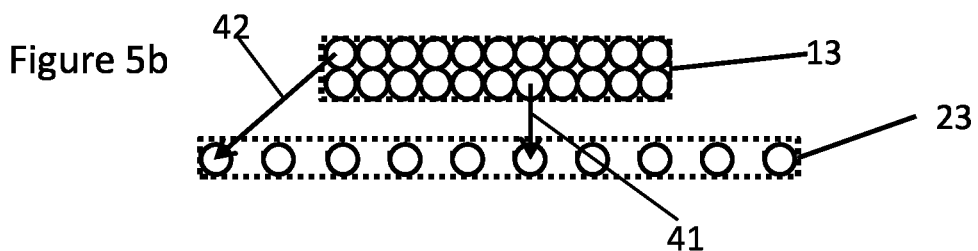
FIG. 5b is a schematic bottom view of optical fibres in an arrangement according to a third embodiment of the probe.
Figure 5C:
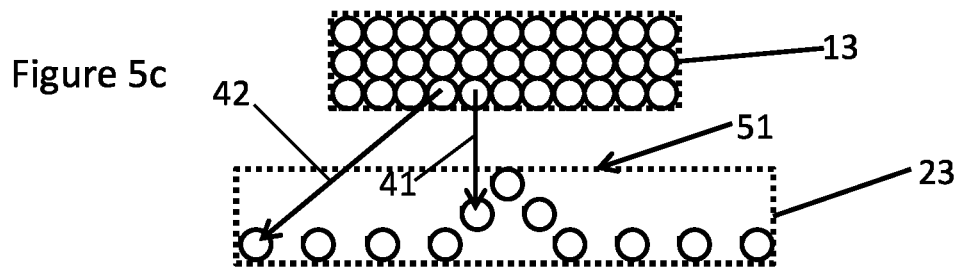
FIG. 5c is a schematic bottom view of optical fibres in an arrangement according to a fourth embodiment of the probe.

FIG. 5a illustrates an arrangement of the optical fibres in a second embodiment of the invention. FIG. 5b illustrates an arrangement of optical fibres in a third embodiment of the invention. FIG. 5c illustrates an arrangement of optical fibres in a fourth embodiment of the invention.

The four illustrated embodiments, which are not limiting, allow to visualize certain characteristics of the invention, which can be considered in combination or independently within the scope of the invention:

the longitudinal extension 24 of the second optical fibres 20 is preferably smaller than their lateral extension 25 (FIGS. 4, 5a, 5b, 5c);

the longitudinal extension 14 of the first optical fibres 10 is preferably smaller than their lateral extension 15 (FIGS. 4, 5a, 5b, 5c);

the lateral extension 25 of the second optical fibres 20 is greater than the lateral extension 15 of the first optical fibres 10 (FIGS. 4, 5a, 5b, 5c);

the longitudinal extension 14 of the first optical fibres 10 is greater than (FIGS. 5a, 5b) or equal to (FIGS. 4, 5c) the longitudinal extension 24 of the second optical fibres 20;

the first optical fibres 10 are distributed into two (FIG. 5b) or three (FIGS. 4, 5a, 5c) laterally extending rows;

the second optical fibres 20 are distributed in one (FIG. 5a), two (FIG. 4, 5b) or three (FIG. 5c) laterally extending rows;

the second optical fibres 20 are on average further apart from each other than the first optical fibres 10 (FIGS. 4, 5a, 5b, 5c); and/or there are more first optical fibres 10 than second optical fibres 20 (FIGS. 4, 5a, 5b, 5c).

FIGS. 6a to 6f illustrate the displacement of the object 2 with the conveyor 3. Considering a marker 91 on the triggering device 8 and a marker 92 on the probe 1, the distance 90 between these markers 91 and 92 is covered by the object 2 in a time t equal to the ratio between this distance 90 and the moving linear speed. The triggering device 8 comprises two detecting elements 81a, 81b laterally offset from each other. Each of the detecting elements 81a, 81b detects a point on the conveyor and the triggering device 8 sends information related to these points to the control unit 510. This information may be object detecting information (when the detecting element 81a or 81b detects the object 2) or conveyor detecting information (when the detecting element 81a or 81b does not detect the object 2 and therefore detects the conveyor 3).

Figures 6A, 6B, 6C, 6D, 6E, 6F:
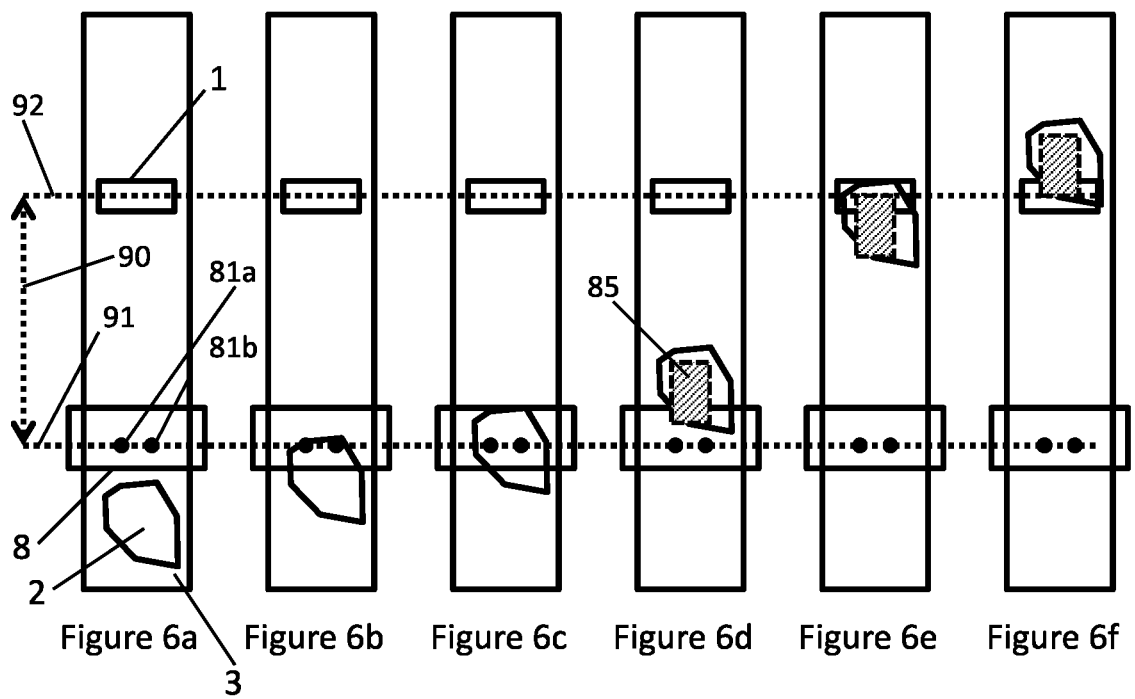
FIGS. 6a to 6f are successive schematic top views of the path of an object passing under the triggering device and then under the probe.

In FIG. 6a, the object 2 is upstream of the triggering device 8. The triggering device 8 detects the conveyor 3, and optionally sends conveyor detecting information. The probe 1 is deactivated.

In FIG. 6b, the first detecting element 81a detects the object 2, whereas it previously detected the conveyor 3. The triggering device 8 sends the object detecting information for the first detecting element 81a to the control unit 510.

In FIG. 6c, the second detecting element 81b also detects the object 2, whereas it previously detected the conveyor 3. The triggering device 8 sends the object detecting information for the first detecting element 81a and for the second detecting element 81b to the control unit 510.

In FIG. 6d, the first 81a and the second 81b detecting elements detect the conveyor 3, whereas they previously detected the object 2. The triggering device 8 sends the conveyor detecting information for the first detecting element 81a and for the second detecting element 81b to the control unit 510. The control unit 510 optionally determines a model 85 of the object 2 and determines its time of arrival in the observation area of the probe 1. The front surface of the model 85 of the object 2 corresponds to the moment when the two detecting elements 81a, 81b detect the object 2 (between FIG. 6b and FIG. 6c). The rear surface of the model 85 of the object 2 corresponds to the moment when at least one of the two detecting elements 81a, 81b detect the conveyor 3 (between FIG. 6c and FIG. 6d).

The control unit 510 uses the information it has received from the triggering device 8, and the time t equal to the ratio between the distance 90 and the moving linear speed to determine a period of observation of the object 2 during which the probe 1 is activated to observe the object 2. Preferably, it uses the model 85 to determine the observation period of the object 2.

In FIG. 6e, the object 2 enters the observation area of the probe 1 to be observed by the probe 1. In FIG. 6f, the object 2 leaves the observation area of the probe 1 and is no longer observed by the probe 1. The period of observation of the object 2 preferably takes place when only the object 2 is observable by the probe 1 (between FIGS. 6e and 6f), for example when only the model 85 is observable by the probe 1. Thus, the probe 1 does not observe anything other than the object 2, thus allowing to avoid parasitic effects from observing a portion of the conveyor or edge effects.

Figures 7A, 7B:
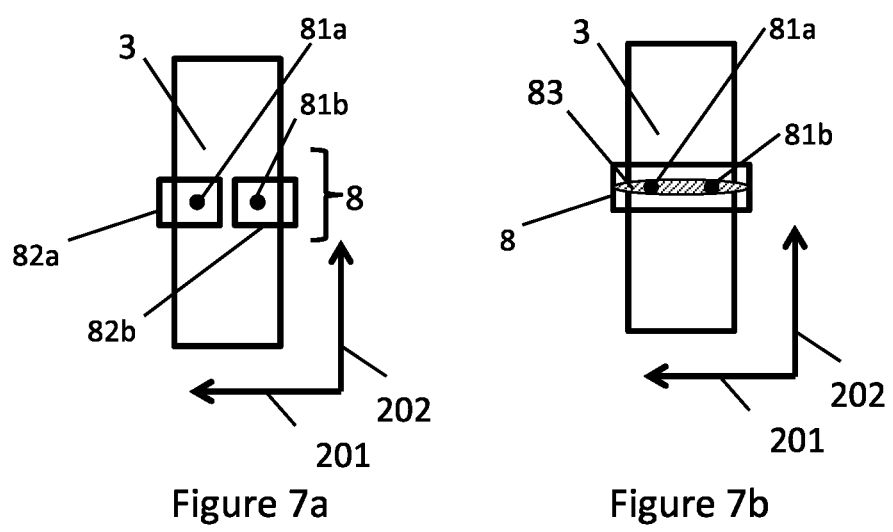
FIG. 7a shows a first embodiment of the triggering device.
FIG. 7b shows a first embodiment of the triggering device.

FIG. 7a illustrates a first embodiment of the triggering device 8, in which it comprises laser detectors 82a, 82b each comprising one of the detecting elements 81a, 81b. They are arranged to be laterally displaceable. Preferably, each of the laser detectors 82a, 82b detects a point on the conveyor.

FIG. 7b illustrates a second embodiment of the triggering device 8, in which it comprises an emitter emitting a laterally extending beam 83 and a detector capturing the beam upon reflection on the object 2 or the conveyor 3. The detecting elements 81a, 81b each comprise a different segment of the detector, capable of detecting a different location on the object 2 or the conveyor 3. Each detecting element 81a, 81b is for example formed by one or more pixels, distinct from the pixel or the pixels of the other detecting element. The triggering device can be, for example, a 2D profilometer.

In other words, the invention relates to a measurement equipment 500 which can be used, in particular, in the context of a control with spectroscopic analysis of individual objects 2 which are in moving. The measurement equipment 500 comprises a probe 1 having a surface 100 into which one or more illumination optical fibres 10 and measurement optical fibres 20 open out. The optical fibres 10, 20 are arranged so that at least one of the second acceptance cones 21 intersects at least one first acceptance cone 11 at less than 10 mm of the surface 100. The measurement equipment 500 also comprises a triggering device 8 that detects the objects 2 upstream of the probe 1 so as to activate or deactivate the observation of the objects 2 by the probe.

The present invention has been described in relation to specific embodiments and arrangements, which are purely illustrative and are not to be regarded as limiting. In a general manner, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

The invention claimed is:

1. A method for spectroscopic analysis of individual drugs moving on a conveyor along a longitudinal direction, the method comprising:
    detecting at least one drug among the moving drugs by a triggering device;
    determining a model of the at least one drug;
    the triggering device comprising two detectors offset from each other along a lateral direction perpendicular to the longitudinal direction, determining the model comprising determining a front surface of the model and a rear surface of the model, the front surface corresponding to a moment when both detectors detect the at least one drug and the rear surface corresponding to a moment when at least one of the detectors detects the conveyor;

based on the model, determining a moment when the at least one drug arrives in an observation area of a probe located downstream of the triggering device;

activating the probe at the moment when the at least one drug arrives in the observation area of the probe;

the probe comprising:
- a probe surface extending along the longitudinal direction and along the lateral direction perpendicular to the longitudinal direction,
- one or more first optical fibres opening out onto said probe surface,
- second optical fibres opening out onto said probe surface, the second optical fibres being offset from the one or more first optical fibres along the longitudinal direction and located on a same side of the one or more first optical fibres, activating the probe comprising
- emitting by the one or more first optical fibres electromagnetic radiation towards the at least one moving drug, each of the one or more first optical fibres having a first acceptance cone, and
- receiving by the second optical fibres electromagnetic radiation reflected by the at least one moving drug, each second optical fibre having a second acceptance cone, at least one of the second acceptance cones intersects at least one first acceptance cone within 10 mm of said surface;

spatially resolved spectroscopic analysing of the electromagnetic radiation reflected by the at least one drug and received by the second optical fibres.

2. The method according to claim 1, wherein, when the triggering device starts to detect the at least one drug, the method comprises:

calculating a moment of activation of the probe based on the triggering device starting to detect the at least one drug and a moving linear speed of the conveyor.

3. The method according to claim 1, wherein the probe is above the drugs, a top of the drugs is located between the probe surface and an intersection between a first acceptance cone and a second acceptance cone.

4. The method according to claim 1, wherein each one of the detectors is a separate laser detector, the laser detectors being arranged to be displaceable along the lateral direction.

5. The method according to claim 1, wherein the triggering device emits a beam extending along the lateral direction, the detectors each comprising a separate segment of a detector arranged to capture the beam after reflection from the objects.

6. The method according to claim 1, wherein the second optical fibres are distributed over the probe surface over a longitudinal extension and over a lateral extension such that the longitudinal extension is less than the lateral extension.

7. The method according to claim 1, wherein the second optical fibres are distributed over a greater width than one or more first optical fibres, the width being taken along the lateral direction.

8. The method according to claim 1, wherein the second optical fibres are distributed over a smaller length than the one or more first optical fibres, the length being taken along the longitudinal direction.

9. The method according to claim 1, wherein the first optical fibres are distributed in at most three laterally extending rows.

10. The method according to claim 1, wherein the second optical fibres are distributed in at most three laterally extending rows.

11. The method according to claim 1, wherein the second optical fibres are on average further apart from each other than the first optical fibres.

* * * * *